A. HODGDON
Whiffletree.
No. 42,852.
Patented May 24, 1864.
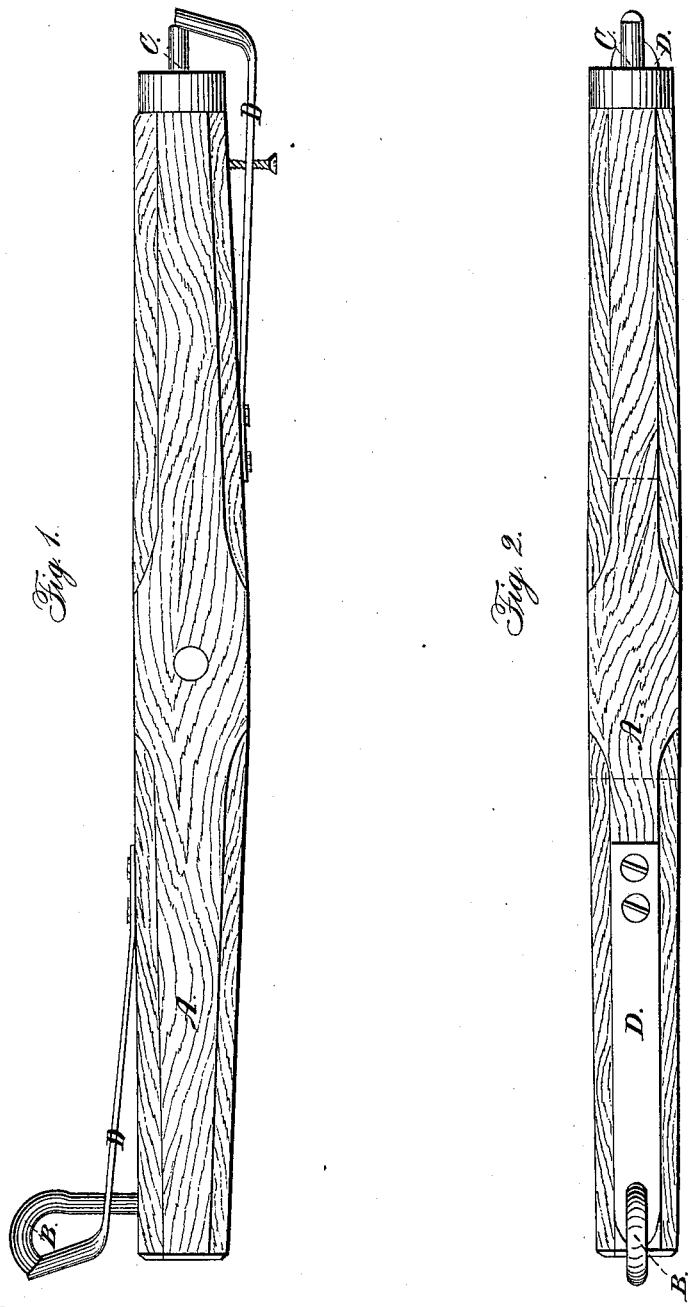
Witnesses:
Abiel Pevey
George C. Pevey
Inventor:
Alvin Hodgdon

UNITED STATES PATENT OFFICE.

ALVIN HODGDON, OF LOWELL, MASSACHUSETTS.

TRACE-HOOK.

Specification forming part of Letters Patent No. 42,852, dated May 24, 1864.

*To all whom it may concern:*

Be it known that I, ALVIN HODGDON, of Lowell, county of Middlesex, and State of Massachusetts, have invented new and useful Improvements in Self-Detaching Trace-Hooks; and I do hereby declare that the following is a full and exact description thereof, reference being had to the accompanying drawings, and to the letters of reference marked thereon, making a part of this specification.

The nature of my invention consists in the arrangement and construction of the springs and trace-hooks or snibals, hereinafter set forth.

To enable others skilled in the art to make and use my invention, I will proceed to describe its construction and operation.

Figure 1 represents a top view of a whiffletree with my invention attached. Fig. 2 represents a side elevation of the same.

A represents the whiffletree; B and C, the trace hook and snibal; D, the spring. With the thumb and fingers press the spring D back; place the trace on the hook B or snibal C; then let the spring D return to its place. In case then the whiffletree breaks, or one trace should become detached, the whiffletree swings around and the draft draws the trace from the hook B or snibal C to spring D, which springs back and lets the other trace off.

What I claim as my invention, and desire to secure by Letters Patent, is—

The improvements in the spring D, for cheapness, convenience, and safety, in combination with the hook B or snibal C, to prevent accident by detaching instantly an ungovernable or affrighted animal from the carriage.

ALVIN HODGDON.

Witnesses:
ABIEL PEVEY,
GEORGE E. PEVEY.